United States Patent
Dumais et al.

(10) Patent No.: US 9,361,387 B2
(45) Date of Patent: Jun. 7, 2016

(54) CONTEXT-BASED SERVICES

(75) Inventors: Susan T. Dumais, Kirkland, WA (US); Barney Darryl Pell, San Francisco, CA (US); Patrick A. Kinsel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 328 days.

(21) Appl. No.: 12/764,985

(22) Filed: Apr. 22, 2010

(65) Prior Publication Data

US 2011/0264656 A1 Oct. 27, 2011

(51) Int. Cl.
*G06F 17/30* (2006.01)
*G06F 17/00* (2006.01)

(52) U.S. Cl.
CPC .................................. *G06F 17/3087* (2013.01)

(58) Field of Classification Search
USPC .......................... 707/705, 728; 709/202, 238
See application file for complete search history.

(56) References Cited

U.S. PATENT DOCUMENTS

| | | | |
|---|---|---|---|
| 6,070,158 A | 5/2000 | Kirsch et al. | |
| 7,099,871 B2* | 8/2006 | Faybishenko et al. | |
| 7,415,104 B2* | 8/2008 | Gray et al. | 379/201.01 |
| 7,606,799 B2* | 10/2009 | Kalinichenko et al. | |
| 7,634,466 B2 | 12/2009 | Rose et al. | |
| 7,647,306 B2 | 1/2010 | Rose et al. | |
| 7,769,756 B2* | 8/2010 | Krikorian | H04N 21/23406 707/736 |
| 8,108,414 B2* | 1/2012 | Stackpole | 707/758 |
| 2008/0005067 A1 | 1/2008 | Dumais et al. | |
| 2008/0214156 A1* | 9/2008 | Ramer et al. | 455/414.1 |
| 2009/0106224 A1* | 4/2009 | Roulland et al. | 707/5 |
| 2009/0171938 A1 | 7/2009 | Levin et al. | |

OTHER PUBLICATIONS

Dalal Mukesh., "Personalized Social & Real-Time Collaborative Search", Retrieved at <<http://www2007.org/posters/poster887.pdf>>,May 8, 2007, pp. 1285-1286.
Bauer, et al., "Real Time User Context Modeling for Information Retrieval Agents", Retrieved at<<http://delivery.acm.org/10.1145/510000/502693/p568-bauer.pdf?key1=502693&key2=0726514621&coll=GUIDE&dl=GUIDE&CFID=72578824&CFTOKEN=36776231>>, Nov. 5, 2001, pp. 568-570.

(Continued)

*Primary Examiner* — Yicun Wu
(74) *Attorney, Agent, or Firm* — Steve Wight; Sandy Swain; Micky Minhas

(57) ABSTRACT

Concepts and technologies are described herein for providing context-based services. In one embodiment, context-based output is provided. The context-based output can include context-based search results for a query. Contextual information can be used to improve access to real-time, social, and other content by enabling a search engine to better understand and/or to supplement queries based upon the context within which the query is received. The contextual information can include, but are not limited to, searches and content associated with the searcher, one or more locations associated with the searcher, the time of day at which a query is received, the device from which a query is received, an application running at the device from which the query is received, the capabilities of the device from which the query is received, and other variables. The contextual information can be used to manipulate the search query, the search results, the presentation of the search results, and/or the content surrounding the search results such as, for example, advertising, links, graphics, and other content.

20 Claims, 5 Drawing Sheets

(56) References Cited

OTHER PUBLICATIONS

"Google Real-Time Search", Retrieved at<<http://googlesystem.blogspot.com/2009/12/google-real-time-search.html>>, Dec. 7, 2009, pp. 3.

Budzik, et al., "User Interactions with Everyday Applications as Context for Just-in-time Information Access", Retrieved at<<http://delivery.acm.org/10.1145/330000/325776/p44-budzik.pdf?key1=325776&key2=2956934621&coll=GUIDE&dl=GUIDE&CFID=72967802&CFTOKEN=11292937>>, 2000, pp. 44-51.

\* cited by examiner

CONTEXT-BASED SERVICES

BACKGROUND

Rapidly changing electronic content such as news content, web log ("blog") content, real-time messaging content, social networking content, and other media, present challenges for search engines. Search engines have been well-tuned to find relevant information for short search queries by leveraging technologies to identify keywords or phrases in a search string. Documents believed to be relevant to the search string may be identified using natural language processing, content matching, document link structure, usage analysis, and/or other user interaction patterns.

Search engines that search real-time data ("real-time search engines") need to evaluate rapidly changing content that has a different link structure, usage, interaction, and linguistic patterns than those found in other web sources. In an effort to identify and provide the most relevant documents for a search query, some real-time search engines rely upon keywords and/or phrases, and organize returned search results on the basis of the time the content associated with the search result was created. Such methods are generally viewed as adequate, as the most recent ideas on a topic can be presented as the first results for a submitted query.

It is with respect to these and other considerations that the disclosure made herein is presented.

SUMMARY

Concepts and technologies are described herein for context-based services. For instance, in one embodiment context-based output is provided. The context-based output can include context-based search results generated by a context server or search engine in response to a received query. Contextual information can be used to improve access to real-time, social, and other content by enabling a search engine to better understand the motivations for, context associated with, and/or other information relating to posts, status updates, real-time messages, and other content. Contextual information also may be used to better understand and/or to supplement user queries based upon the context within which the query is received.

According to one aspect, contextual information includes data that indicates a context within which data objects are created and/or within which queries are created. For example, the context can include, but is not limited to, patterns of searches and content associated with the searcher, one or more locations associated with the searcher or a query, the time of day at which a data object or a query is received, the device from which a data object is generated or from which a query is received, an application running at the device from which the data object is created or from which the query is received, the capabilities of the device from which the data object was created or from which the query is received, and other variables. The contextual information can be used to manipulate the search query, the search results, the presentation of the search results, and/or the content surrounding the search results such as, for example, advertising, links, graphics, and other content.

According to another aspect, historical data is collected and maintained. The historical data is used to recognize trends and/or patterns in searches and/or content, and may be used as another variable when providing context-based services for queries or other operations. The historical data can be used to build a representation of context associated with data objects. Feedback from users interacting with context-based services can be used to update the representation of the context, which can be stored as the historical data.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
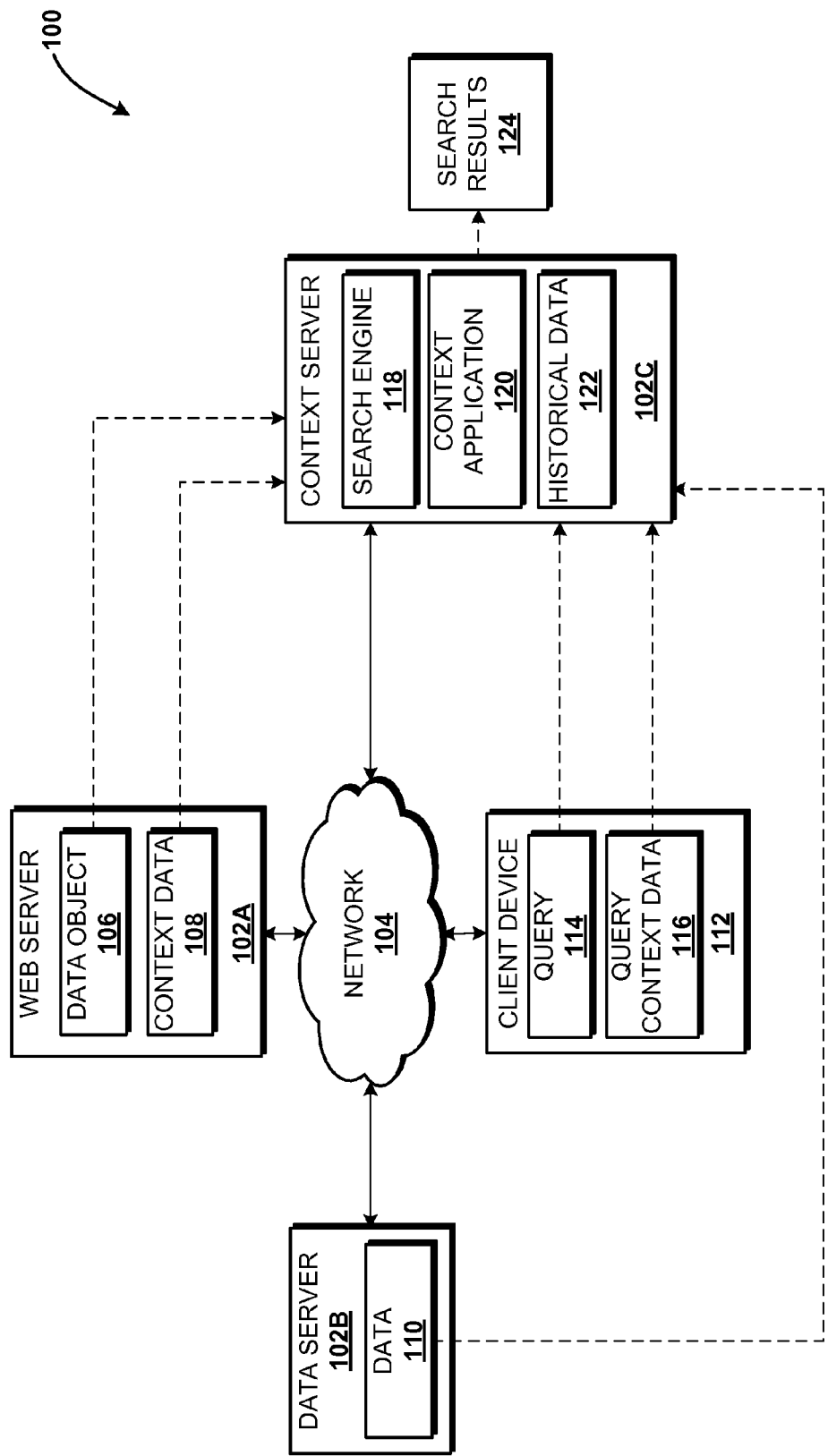
FIG. 1 is a system diagram illustrating an exemplary operating environment for the various embodiments disclosed herein.

The following detailed description is directed to technologies for providing context-based services. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for providing context-based services will be presented.

Referring now to FIG. 1, aspects of one operating environment 100 for the various embodiments presented herein will be described. The operating environment 100 shown in FIG.

1 includes a web server 102A that operates on or in communication with a network 104. The web server 102A can be a web server that is accessible via the Internet, and can host data such as a data object 106 and context data 108. Although only one web server 102A is shown in FIG. 1, some embodiments of the operating environment 100 include more than one web server 102A.

The data object 106 can include, but is not limited to, any type of data that a user or entity wishes to retrieve via a search. Thus, a data object 106 can include almost any data relating to documents, information about people, products, blog postings, articles, real-time messages, photographs, audio and video files, social network status updates and/or "walls," chat room data, combinations thereof, and the like.

The context data 108 can indicate one or more contexts associated with the data object 106. The context of the data object 106 may include, but is not limited to, one or more locations associated with the data object 106, one or more times at which the data object 106 was created or modified, one or more devices at or from which the data object 106 was created or modified, one or more applications in use at the device at or from which the data object 106 was created or modified, one or more persons associated with the data object 106, one or more usage patterns associated with the data object 106, and/or other data associated with the data object 106. Additionally, the context data 108 can include confidence intervals associated with each context including, but not limited to, the locations, times, devices, applications, persons, usage patterns, other data, and combinations thereof associated with the data object 106. The context data 108 is data that describes the context of the data object 106. The context data 108 will be described in more detail below with reference to FIG. 2.

In some embodiments, the web server 102A hosts a social networking application, and the data object 106 relates to a social networking "wall" associated with a user. The user and members of the user's social network are allowed to post comments, links, video, audio, and other content to the social networking wall. The data object 106 may be postings on a wall, for instance. In social networking embodiments, the context data 108 can indicate a person associated with a social networking account, a location at associated with the social networking account and/or the person, a time at which the social networking information corresponding to the data object 106 was created and/or modified, patterns according to which the data object 106 is updated and/or modified, applications or programs running at or installed at devices that host the data object 106 and/or devices used to update the data object 106, as well as other contextual information associated with the social networking account and/or the web server 102A.

In some embodiments, the operating environment 100 further includes a data server 102B. The data server 102B hosts data 110. The data 110 can be stored in a database, memory, or other data storage device at or in communication with the data server 102B. The data server 102B can be any server operating on or in communication with the network 104, and can host information including, but not limited to, event information for venues such as concert schedule, other location-based information, weather data for locations and/or times, historical data such as significant dates and locations, lists of typical interests or subscriptions associated with particular ages or interests, and the like. It should therefore be appreciated that the data server 102B can be almost any server operating on or in communication with the network 104.

The operating environment 100 further may include a client device 112 operating on or in communication with the network 104. According to various embodiments, the client device 112 is a standard desktop or laptop personal computer system. It should be appreciated, however, that the client device 112 may include other types of computing systems including, but not limited to, server computers, handheld computers, netbook computers, tablet computers, embedded computer systems, video game consoles, personal digital assistants, mobile telephones, smart phones, or other computing devices.

The client device 112 is configured to generate a query 114, for example, a search query. The query 114 can be generated explicitly or implicitly. An example of an explicitly created query 114 includes a search string submitted to a search engine. An example of an implicitly created query 114 includes, but is not limited to, recognizing that the client device 112 has arrived at a location and generating a query 114 that identifies friends or acquaintances at the location. The client device 112 also hosts, or generates upon request, content and query context data 116. The query context data 116 describes one or more contexts within which the query 114 is generated, including, but not limited to, a time at which the query 114 is generated, a location at which the query 114 is generated, attributes of a person or entity who generated the query 114, the capabilities of the client device 112, applications or products installed on or running at the client device 112, attributes of a service provider via which the client device 112 submits the query 114, and the like. It should be understood that in some embodiments, the query 114 is a combination of explicit data and implicit data. For example, the query 114 may be explicitly generated, such as by a search string submitted to a search engine. As will be explained below, the query 114 also may be modified by implicit data ("implicitly augmented") such as the context data 108 and/or the query context data 116. The types of data that can be included in the query context data 116, and the use of the query context data 116, will be described in more detail below with reference to FIGS. 2-4.

The operating environment 100 further includes a context server 102C configured to receive a request for context-based services, and to satisfy the request. In some embodiments, the context server 102C hosts a search engine 118, a context application 120, and historical data 122. Although the context server 102C is illustrated as including the search engine 118, the context application 120, and the historical data 122, it should be understood that the functionality of the search engine 118 and/or the context application 120 can be provided by other servers and/or computers that are configured to execute one or more program modules to provide the functionality described herein, and that the historical data 122 can be stored at additional or alternative data storage devices including, but not limited to, servers, memory devices, databases, and the like. Thus, it should be understood that the functionality of the context server 102C can be provided by one or more devices executing one or more program modules and/or providing one or more data storage locations.

The context server 102C receives or accesses the query 114, which is generated at the client device 112. The search engine 118 is configured to analyze the query 114, perform a search corresponding to the query 114, and obtain search results 124 satisfying the query 114, as is generally known. The context server 102C is further configured to receive and/or to access one or more of the data object 106 and the context data 108, the data 110, the query context data 116, and/or the historical data 122 (herein collectively referred to as "the collected contextual data") to determine a context associated with the query 114 and/or data corresponding to the search results 124.

In some embodiments, the context application 120 analyzes the collected contextual data to identify one or more contexts within which the query 114 is generated. The context application 120 can identify words, phrases, and/or concepts reflected by the collected contextual data, and can take an action based upon the context within which the query 114 is generated. In some embodiments, the context application 120 manipulates the query 114 by adding, removing, ranking, disambiguating, and/or reordering search terms, metadata or operators associated with the query 114, thereby incorporating the identified context in a search operation.

The context application 120 can generate a modified query 114, and can pass the modified query 114 to the search engine 118. In some embodiments, the context application 120, or another program module (not illustrated), manipulates the search results 124 in addition to, or instead of, the query 114. The context application 120 may use the determined context to rank, filter, diversify, personalize, summarize, disambiguate, and/or present the search results 124. These and other functions of the context server 102C are described below with reference to FIGS. 3-4.

While the operating environment 100 has been illustrated in the context of providing context-based search results 124, it should be understood that the concepts and technologies described herein can be used to provide other context-based services. Some exemplary embodiments of such context-based services will be described below with reference to FIG. 4.

For the sake of clarity, FIG. 1 illustrates one web server 102A, one data server 102B, one context server 102C, one network 104, and single data, contextual data, and program modules. It should be understood, however, that some implementations of the operating environment 100 include multiple servers 102A, 102B, 102C, multiple networks 104, and multiple data, contextual data, and program modules.

Figure 2:
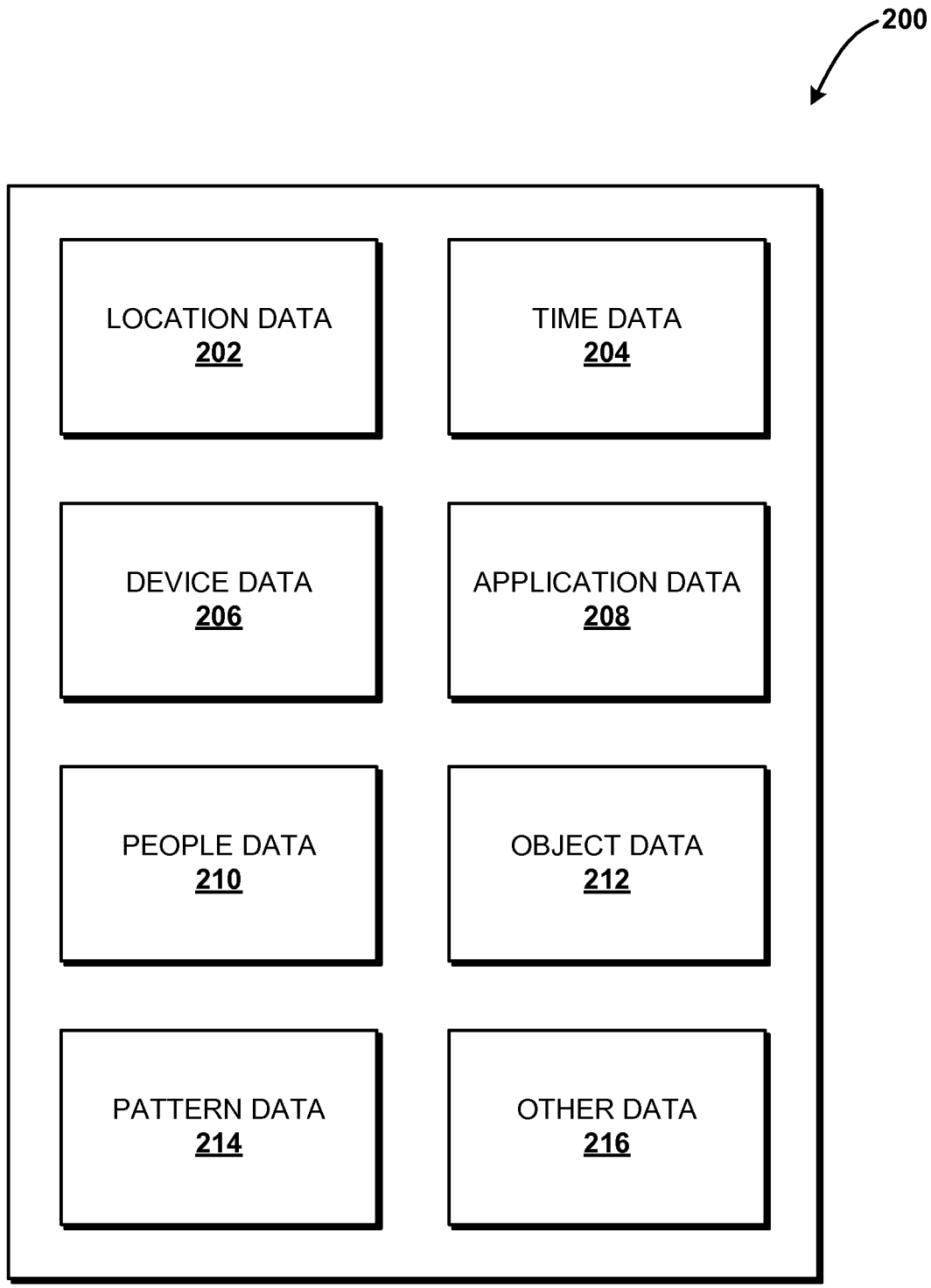
FIG. 2 is a block diagram illustrating context data, according to an exemplary embodiment of the present disclosure.

FIG. 2 is a block diagram illustrating a data structure 200 for storing contextual data such as the context data 108 and/or the query context data 116 illustrated in FIG. 1, according to an exemplary embodiment. As explained above, the context data 108 and the query context data 116 can be associated with one or more data objects 106. The data structure 200 can represent data stored in a database, at a storage location associated with the web server 102A or the client device 112, and/or another structure. The data structure 200 includes location data 202, time data 204, device data 206, application data 208, people data 210, object data 212, pattern data 214, and/or other data 216. As mentioned above, one or more confidence intervals can be associated with the data stored in the data structure 200, and each type of data can include multiple values.

The location data 202 indicates one or more locations associated with the data object 106 and/or the query 114. In the case of the data object 106, the location data 202 can indicate one or more locations associated with the data object 106. For example, the data object 106 can include a social networking account associated with a user. The location data 202 of the context data 108 can indicate one or more locations associated with the social networking account. The locations associated with the social networking account can be determined based upon explicit and/or implicit information such as, for example, a hometown or other location associated with the account, a billing address associated with the account, locations referenced in one or more status updates or other postings associated with the account, locations at which the social networking service is hosted, combinations thereof, and the like.

In the case of the query context data 116, the location data 202 can indicate one or more locations at which the query 114 is generated and/or submitted. Thus, the location data 202 can indicate the location of the client device 112. It should be understood that the location data 202 can be defined in varying degrees of specificity. For example, the location data 202 may define an area such as a country, region, state, county, metropolitan area, city, town, ZIP code, street address, venue, business or establishment, room, area of a room, and the like. Thus, the location data 202 can be obtained using a variety of sensors and/or hardware including, but not limited to, cellular networking hardware, location servers, Global Positioning System ("GPS") receivers, location beacons, Internet Protocol ("IP") addresses, WIFI hotspots, and the like.

Furthermore, varying levels of precision may be used to determine the location data 202, if desired. For example, in the case of cellular networking hardware, the location data 202 may be obtained by determining a Home Location Register ("HLR") and/or Visiting Location Register ("VLR") associated with the client device 112. Thus, the location data 202 may be defined as a broad location corresponding to a country or region of the country, in the case of an HLR, or a network in the case of the VLR. If a more precise definition of the location data 202 is desired, the location data 202 can be obtained by determining a Base Station Controller ("BSC") and/or a Base Transceiver Station ("BTS") through which the client device 112 is communicating. It should be understood that any protocols and/or standards may be employed, and that the use of GSM equipment is merely exemplary.

The time data 204 can indicate one or more times associated with the data object 106 and/or the query 114. In the case of the context data 108, the time data 204 can indicate times referenced within or by the data object 106. In the case of the query context data 116, the time data 204 can indicate a time at which the query 114 was generated. The time data 204 can be defined in any desired units, depending upon the level of precision desired, and can be obtained using various hardware and/or software elements. In some embodiments, the time data 204 is defined by the exact time of day in the hour/minute/second format. In some embodiments, the time data 204 is defined as a portion of a day, for example, morning, afternoon, evening, or night. In some embodiments, the time data 204 is defined as a date, a day of the week, a week number, a month, a quarter number, a year, a century, a millennium, and the like. Thus, it should be understood that the time data 204 may be defined as broadly and/or as narrowly as desired, and may be defined depending upon the application for which the time data 204 is used.

For example, if a search query 114 includes the word "anniversary," the context server 102C may be configured to interpret the time data 204 as a date or year, as "anniversaries" are typically celebrated based upon a date or number of years. Furthermore, the context server 102C can interpret the time data 204 in more than one way and associate a confidence with those interpretations. In the immediately preceding example, the context server 102C can interpret the time data 204 as the date and the year, and can rank search results according to their first meeting the date definition of the time data 204, and then according to their meeting the year definition of the time data 204. This example is merely illustrative of a contemplated use of the time data 204, and should not be construed as being limiting in any way.

The device data 206 indicates a type of device and/or device capabilities associated with the data object 106 and/or the client device 112. The device data 206 can be used to establish another aspect of the context within which the data object 106 and/or the query 114 is generated. In the case of the query context data 116, for example, the device capabilities can be used to analyze the query 114 for typographical errors, and the like. For example, the device data 106 may indicate that the client device is a mobile phone with a standard keypad or a touch screen instead of a QWERTY keyboard. Such an indication may be used to analyze the query 114 for common or expected typographical errors based upon the use of a keypad or a touch screen instead of a QWERTY keyboard.

In another example, the device data 206 may indicate a display resolution, a number of displayable colors, an aspect ratio, and/or other aspects of a display associated with the client device 112. This information can be used to modify the output of the context server 102C, if desired. Other device data 206 such as the bandwidth capabilities of the client device 112, the processor speed or memory capacity of the client device 112, and the like, may be used to modify the output of the context server 102C, if desired.

As mentioned above, the device data 206 may include or may be associated with confidence intervals for assumed device capabilities. For example, if the device data 206 may indicate that a client device 112 with a touch screen can interface with an optional QWERTY keyboard. Furthermore, a confidence interval associated with that capability may indicate that only 5% of all users of the make and model of the client device 112 use the optional QWERTY keyboard. Thus, the device data 206 and the associated confidence interval may be understood to indicate that the client device 112 does not include a QWERTY keyboard, with a 95% confidence interval. The above examples of device data 206 and the confidence intervals that may be associated therewith are illustrative, and should not be construed as being limiting in any way.

The application data 208 may indicate one or more applications installed at or being executed at the web server 102A, a device associated with the data object 106, the client device 112, and/or another device or location. The application data 208 may be used to establish another aspect of the context within which the data object 106 and/or the query 114 are/were created. The application data 208 can be allowed, blocked, and/or generalized by users or devices, based on privacy, security, and/or other concerns. For example, the application data 208 may indicate that the client device 112 is currently running the WORLDWIDE TELESCOPE application from MICROSOFT CORPORATION.

Thus, if the query 114 includes the word "ring," the context server 102C may infer that the search for "ring" is related to astronomy, and may supplement the query 114 with the words "Saturn," "Neptune," "Uranus," and/or "Jupiter," as each of these planets has rings. These words may be added to the query 114 and/or ranked as desired. In particular, Saturn's rings are best known, and may therefore correspond to the most likely target of the query 114. On the other hand, Jupiter's rings are the least known, and may therefore correspond to the most likely target of the query 114. How to augment or modify the query 114 and/or the search results 124 based upon the application data 208 may be determined by the context server 102C, and may be based upon preferences, user input, and the like. In some embodiments, a preference or setting may specify that the query 114 should automatically be augmented by implicit information when context data 108 and/or query context data 116 is available. Furthermore, as mentioned above, confidence intervals may be associated with each different interpretation of the query 114 based upon the application data 208, and the different interpretations of the query 114 may be ordered or ranked according to the confidence intervals, if desired. These examples are merely illustrative and should not be construed as being limiting in any way.

The people data 210 may indicate one or more people associated with the data object 106 and/or the query 114. The people data 210 can include one or more people, one or more groups of people, one or more organizations, and the like. The object data 212 can indicate one or more objects associated with the data object 106 and/or the query 114.

The pattern data 214 may indicate one or more patterns of locations, times, devices, applications, people, and objects over multiple instances. The pattern data 214 associated with a data object 106 may be compared to the pattern data 214 associated with the query context data 216 to determine if a location at which a query is generated 114 is typical or atypical for the user. The pattern data 214 may be stored as or with the historical data 122, if desired, or may be retrieved by the context server 102C when needed.

The other data 216 is additional data associated with the data object 106. For instance, the other data 216 may indicate additional data describing a person associated with the data object 106 such as a gender of a person associated with the data object 106, an age of the person associated with the data object 106 and/or the query 114, a citizenship of the person associated with the data object 106 and/or the query 114, a religion, culture, or nationality of the person associated with the data object 106 and/or the query 114, and the like. Additionally, the other data 216 can describe other contextual data. For example, the other data 216 can indicate assumptions associated with the data object 106 and/or the query 114, confidence intervals associated with contextual data relating to the data object 106 and/or the query 114, and the like. Additionally, the other data 216 can describe whether or not the client device 112 is stationary, an altitude at which the client device 112 is located, the weather at or near the client device 112, a rate of speed associated with the client device 112, and the like.

In other embodiments, the other data 216 can include data indicating the capabilities or attributes of a service provider via which the client device 112 connects to the context server 102C. It should be understood that the service provider may provide, limit, or restrict various capabilities, attributes, limitations or features, thereby affecting the functionality and capabilities of the client device 112. Additionally, information relating to the service provider may provide additional details relating to the context such as whether the client device 112 is connected via an enterprise connection, a consumer Internet service provider (ISP) connection, or the like. Furthermore, information relating to the service provider may indicate a group, division, company, subdivision, or even a workgroup with which the client device 112 is associated, all of which may provide additional context for interactions with the client device 112.

Figure 3:
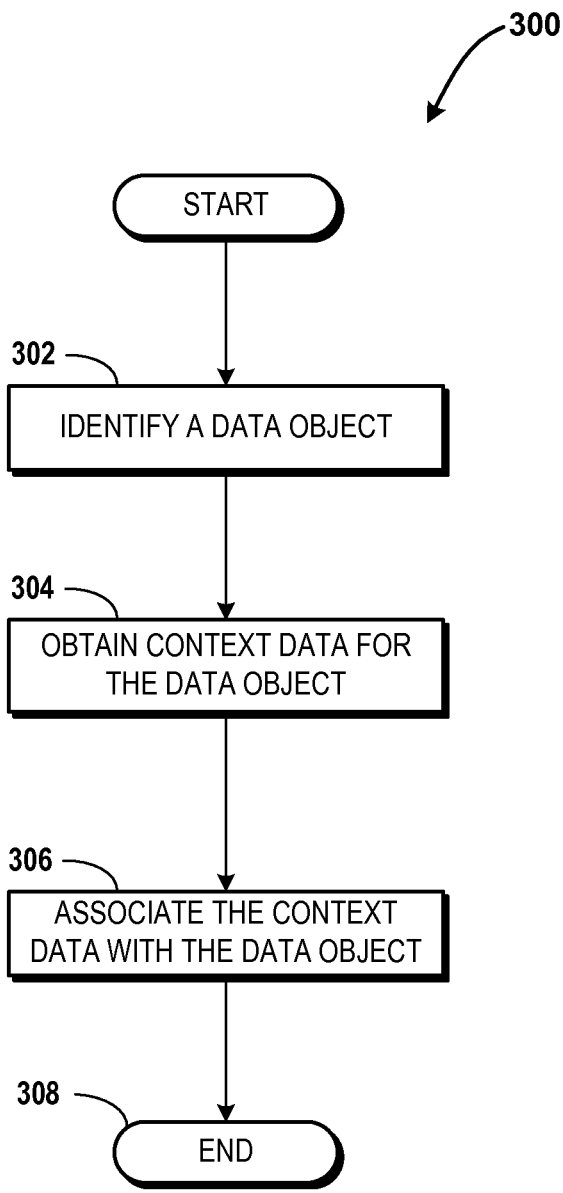
FIG. 3 is a flow diagram showing aspects of a method for associating context with a data object, according to an exemplary embodiment of the present disclosure.

Turning now to FIG. 3, a method 300 for associating context data 108 with a data object 106 will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the context server 102C. As explained above, it should be understood that the search engine 118, the context application 120, and the historical data 122 can be hosted by and/or can be executed by one or more devices in addition to, or instead of, the context server 102C. Thus, the described embodiments are merely exemplary and should not be viewed as being limiting in any way.

The method 300 begins at operation 302, wherein the context server 102C identifies a data object 106. The data object 106 can be identified as satisfying a search query, for example, the query 114. As explained above, the data object 106 can include one or more documents such as posts on social networking wall or one or more status updates. For purposes of illustrating the concepts and technologies disclosed herein, and not for purposes of limiting the disclosure, the data object 106 will be described as a message associated with a real-time messaging user, for example, a user of the TWITTER real-time messaging service. This example is merely illustrative.

In the example presented herein, the data object 106 is a real-time message about a movie entitled "AVATAR," posted by the user while watching the movie at a movie theater. It should be understood that a single real-time message may or may not convey a great deal of detail about the topic addressed by the message. The context data 108 can be used to provide additional context relating to the data object 106, thereby providing details that may not be included or evident from the data object 106.

The context data 108 may include, but is not limited to, data indicating the location at which the data object 106 was created or modified, the time at which the data object was created or modified, and a person associated with the data object 106. For purposes of further explaining the concepts described herein, it is assumed that the context data 108 indicates the "Triangle Theater" as the location at which the data object 106 was created or modified, Friday, Feb. 26, 2010 at 8:37 P.M. as the time at which the data object 106 was created or modified, and a particular user as the person who modified or created the data object 106. These examples are merely illustrative and should not be construed as being limiting in any way.

From operation 302, the method 300 proceeds to operation 304, wherein the context server 102C obtains the context data 108 for the identified data object 106. In some embodiments, the context server 102C obtains the context data 108 by connecting to the web server 102A and downloading the context data 108, wherein the context data 108 may be determined at another time and may be hosted by the web server 102A.

In some embodiments, the context server 102C accesses the web server 102A and/or queries the web server 102A to obtain data corresponding to the context data 108. For example, the context server 102C may query the web server 102A for information regarding a particular post, which can correspond to the data object 106. The web server 102A may respond with data relating to the identified post, such as the name of the poster, the age of the poster, the location of the poster, the time at which the post was created, and the like. Additionally, the context server 102C may query the data server 102B to determine if a location associated with data object 106 has significance. The data 110 can include, for example, a list of movie theatres by street address and/or movie show times. Thus, the context server can determine that a post generated at a particular location at a particular time can correspond to a post generated while watching a particular movie. These data may be transmitted to the context server 102C or may be downloaded by the context server 102C, if desired.

In some embodiments, a user database including context data 108 or context data 116 relating to users is generated and maintained. The user database can include search profiles associated with users or searching entities, context data 108 associated with data objects 106, context data 116 associated with queries 114, users associated with a social networking or real-time messaging service, and the like. The user database may be stored as the historical data 122 and/or at another data storage location. Thus, retrieving the context data 108 includes, in some embodiments, accessing the historical data 122 and locating a record corresponding to the data object 106 or the query 114.

From operation 304, the method 300 proceeds to operation 306, wherein the context server 102C associates the context data 108 with the data object 106. In some embodiments, the operation 306 includes identifying context data 108 associated with the data object 106 and storing data identifying that association. Such an association may be indicated by data stored at a data storage location such as, for example, the historical data 122, as explained above. In some embodiments, no data is stored during the operation 306. Instead, context data 108 associated with the data object 106 is identified and is analyzed. The method 300 ends at operation 308.

Figure 4:
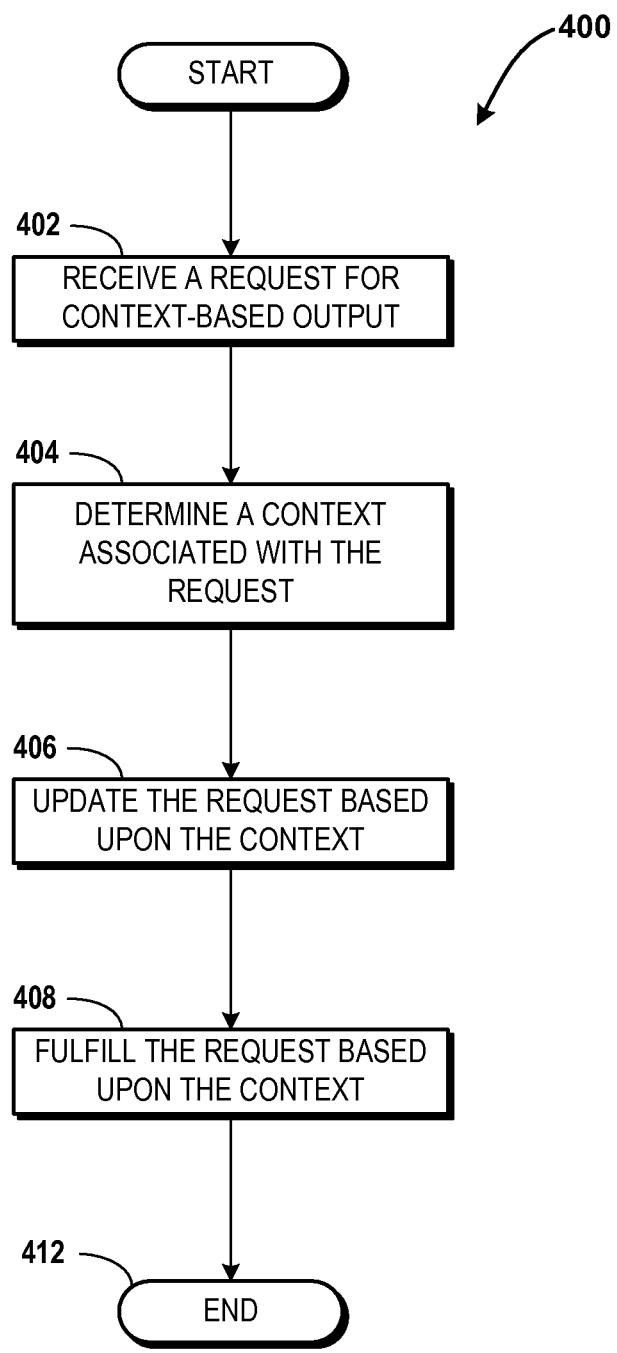
FIG. 4 is a flow diagram showing aspects of a method for providing context-based services, according to an exemplary embodiment of the present disclosure.

FIG. 4 illustrates a method 400 for providing context-based services, according to an exemplary embodiment. The method 400 begins at operation 402, wherein the context server 102C receives a request for context-based services. As mentioned above, the request for context-based services will be described as a search query such as the query 114. In some embodiments, the query 114 is received from the client device 112.

From operation 402, the method 400 proceeds to operation 404, wherein the context server 102C determines a context associated with the query 114. The context associated with the query 114 can be indicated by the query context data 116. The query context data 116 may be submitted by the client device 112 with the query 114, may be hosted by the client device 112 and retrieved by the context server 102C, and/or may be obtained by the context server 102C by querying the client device 112 and/or other hardware and software such as location servers, clocks, user databases, and the like.

As explained above, the query context data 116 can indicate various aspects of the context within which the query 114 was created. For example, the query context data 116 can indicate a time at which the query 114 was generated, a location at which the query 114 was generated, a person or entity associated with the query 114, a device used and/or capabilities of a device used to generate the query 114, applications or programs running or installed at the device used to generate the query 114, search patters associated with the user and/or device who generated the query 114, and the like.

From operation 404, the method 400 proceeds to operation 406, wherein the context server 102C updates the query 114 based upon the determined context associated with the query 114. As mentioned above, the context server 102C can add terms, metadata or operators to the query 114, remove terms from the query 114, reorganize terms or phrases within the query 114, rank or weight terms or phrases within the query 114, and/or otherwise manipulate the query 114 to incorporate additional information relevant to the query 114, as indicated by the query context data 116. As will be explained in more detail below, some embodiments include manipulating output such as the search results 124 based upon the query context data 116 instead of, or in addition to, manipulating the query 114. As such, the steps described with respect to the operation 406 can be performed after context-based output is generated instead of, or in addition to, manipulating a request such as the query 114.

From operation 406, the method 400 proceeds to operation 408, wherein the context server 102C generates the context-based output. The context-based output can include the search results 124, as mentioned above, though additional and/or alternative embodiments for providing context-based services are described in more detail below. Thus, the operation 408 can include performing a search based upon the query 114, as manipulated in view of the query context data 116, and providing the search results 124 to a requesting device such as, for example, the client device 112. The method 400 ends at operation 410.

Although the foregoing has described the use of context primarily with respect to a query 114 and generating search results 124, additional embodiments are contemplated and are possible, as mentioned above. It should be understood that the context may be used to manipulate the search results 124 as well as, or instead of, the query 114. For example, a user or device may request filtering of the search results 124 based upon a location associated with the search results in order to identify search results associated with local locations. Any of the contextual data discussed above may be used to filter the search results. Similarly, the user or device may request ranking of the search requests 124 based upon one or more aspects of a context within which the request is made. The user or device may request that the search results 124 be ranked based upon any of the contextual data discussed above with reference to the context data 108 and/or the query context data 118.

The search results 124 satisfying the specified contextual data may be ranked higher or lower than the search results 124 that do not satisfy the contextual data. For example, if a user generates a query 114 for "AVATAR," the search engine 118 may search for "AVATAR." Included in those results may be results relating to the movie called "AVATAR," which was the focus of the query 114 generated by the user. The user or entity can submit or generate a request to filter and/or rank the search results 124 based upon additional terms, metadata, or operators generated by analyzing the context within which the query 114 was submitted. Any aspects of the context may be used to filter and/or rank the search results 124, without modifying the actual query 114 used to obtain the search results 124.

In some embodiments, contextual data is stored with other data such as a previous query, click logs, or the like, and may be used to provide additional context-based services. For example, the context can be used to identify query activity such as queries and click activity ("related activity"). The related activity may be expected to be related to the submitted query 114 on the basis of the respective contexts associated with the query 114 and the related activity. The context within which the query 114 is received can be identified, and previous sessions within which other searches, additional search terms, clicks on search results, and/or other activity occurred can be analyzed to identify information such as queries or search results 124 that are expected to be relevant to a user submitting the query 114.

In some embodiments, queries, click logs, and other activity associated with search sessions may be stored in logs with contextual data. The click logs may include an indication as to what search results 124 were clicked on and/or read through after receiving a particular query. Clicked on search results may be understood as indicating relevant results for the query 114 if the queries or context associated with the relevant results are similar to the query 114 and/or the context associated with the query 114. For example, if a query 114 is submitted by a mobile device, the logs may be searched for searches received during sessions with mobile devices, and these searches may be further analyzed to identify queries that are similar to the query 114. Similarly, queries or other activity associated with desktop devices may be deemed as less relevant or even irrelevant based upon the respective contexts of the query 114 and the queries stored in the logs. Therefore, it should be understood that information with a different context from that associated with the query 114 may be omitted from a "related search" list, or may be ranked as less relevant, but nonetheless provided to a user of review. It should be understood that the context data may be used for online or offline processing or data mining, and need not be provided solely in real-time during search sessions.

In some embodiments, the context server 102C uses context to diversify search results based upon contextual data. "Diversifying," for purposes of this description includes, but is not limited to, determining the context within which the query 114 was created, identifying additional terms, phrases, concepts, metadata, and/or operators relating to the identified context, and generating additional search results 124 that do not relate directly to the identified context. Diversifying the search results 124 by adding results that do not appear to satisfy the query 114 and/or the context within which the query 114 was generated, adds search results 124 that are not directly related to the query 114 and the context, thereby possibly providing search results 124 even if the determined context is incorrect.

In some embodiments, the context server 102C uses context to personalize a web site and/or to generate targeted advertisements for a web page such as a results page displaying the search results 124. It should be understood that the context server 102C can be configured to function as a resource used by a device serving the search results 124, and need not generate and/or serve the search results 124. The request to personalize a web page and/or to generate targeted advertisements may be received every time the context server 102C outputs context-based information, or may be set by a preference, a cookie, or a hardware or software instruction. Regardless of how the request for the targeted advertisements or personalized data is requested, the contextual data can be used to generate targeted advertisements for the searcher based not only upon a query 114, but also based upon the context, as explained above with respect to manipulating the query 114. Additionally, the context within which context-based services is requested may be used to personalize a web page to include relevant information based upon the context, as explained above.

In some embodiments, the context server 102C uses context to summarize the search results 124, and/or to modify a presentation method or format used for one or more interfaces with which the context server 102C or another device interacts with a user of the client device 112. For example, the device capabilities associated with the client device 112, the location of the client device 112 or other device associated with the query 114, the speed at which the client device 112 is moving, an event at which the client device 112 is believed to be located, and the like, may be used to alter how the search results 124 are presented to the searching entity. Similarly, the context server 102C can summarize the search results 124 based upon an anticipated use, need, and/or desire of the party associated with the query 114. For example, if a query 114 relates to a topic that is frequently associated with teens or pre-teens, the context server 102C can determine that the entity associated with the query 114 is a teen or a pre-teen, and can summarize and/or present the search results 124 in accordance with the determined age of the requesting party.

In some embodiments, a high contrast or multiple-colored scheme is used if the entity associated with the query 114 is believed to be a teen or pre-teen. Similarly, a summary of the search results 124 may be prepared wherein certain words are used or not used based upon the perceived age of the entity requesting the search. For example, the acronym "LOL" may be understood by a teen or pre-teen to indicate that a topic is humorous, but may not be understood by an older searcher. Thus, the context server 102C can replace the acronym "LOL" with "laughing out loud!" or other phrase. This example is merely exemplary, and should not be construed as being limiting in any way.

Other operations that can be based upon contextual information include, but are not limited to, determination of candidate terms for auto-complete functionality, query refinements, identification of instant answers, snippets, notification operations, combinations thereof, and the like. With respect to notification operations, for example, a searcher may request to be notified if a user posts information about a particular band from a particular location, or the like. Other aspects of context can be used to generate notifications to searchers. Additionally, context can be used to make recommendations to searchers. For example, if other searchers have generated identical or similar queries 114, and other users with similar contextual data have selected a particular search result 124, the context server 102C can recommend the particular search result 124.

In some embodiments, context is used to provide query support. For example, the context within which a query 114 is generated can be used to make spelling suggestions, search suggestions, auto-complete phrases, and/or to identify trending topics and suggest those trending topics to the search entity. For example, the context server 102C may determine that a user is located at a location called "Green Beach." In view of this determination, a query 114 requesting information about a "green beech" may be determined to be a typographical error, as opposed to a search about green beech trees. Thus, it should be understood that the context may be used to disambiguate queries 114 by comparing the context associated with the query 114 to other queries and activity stored in logs or other stored session and context data. The example of using location data to disambiguate a query 114 should therefore be understood as being exemplary.

In some embodiments, other contextual data is used to disambiguate terms or phrases within the query 114. For example, a user or entity may generate a query 114 for "Augusta" during the Masters Tournament, with the hopes of retrieving results for "Augusta National Golf Club." Some search programs, however, may return search results corresponding not only to "Augusta National Golf Club," but also may return search results corresponding to cities called or including the name "Augusta," which exist in Alabama, Alaska, Arkansas, Florida, Georgia, Iowa, Kansas, Kentucky, Maryland, Maine, Michigan, Missouri, Mississippi, Montana, New Jersey, New York, Ohio, South Carolina, Texas, Washington, Wisconsin, West Virginia, and outside of the United States. Additionally, the search may return many results unrelated to the desired subject. Thus, the context server 102C can use the context data to disambiguate the query 114, which can be accomplished by adding, removing, or otherwise manipulating the query 114. In the above example, the context server 102C may add the words "golf," "GA," "masters," and/or the like to disambiguate the query 114.

In disambiguating the terms or phrases of a query 114, the context server 102C may use the data 110 submitted by the data server 102B, or may retrieve the data 110. In the above-cited example regarding the search for "Augusta," the context server 102C may access the data server 102B, wherein the data server 102B hosts schedule data for the Masters Tournament as the data 110. The context server 102C can recognize that the Masters Tournament is currently underway, and/or that the user is at or near Augusta National Gold Club in Augusta, Ga. In response to making this determination, the context server 102C can attach a probability that the searcher is actually searching for information regarding the Augusta National Gold Club and/or the Masters Tournament.

In another example, the context server 102C uses the data 110 to disambiguate a search term with respect to time and/or location. For example, the context server 102C may identify a particular location. Based upon the data 110, the context server 102C may associate the location with a concert venue. Based upon two different times, the context server 102C may associate one of two different bands with the venue. A fan of Metallica may have different interests and/or needs than a fan of Gordon Lightfoot, though such events can occur at the same venue on consecutive days. This example is merely illustrative of how various levels of context data may reveal how events at a particular location can change with respect to time.

Although not described herein in detail, it should be understood that each determination made by the context server 102C can have a corresponding confidence interval. For example, the context server 102C may determine that a person associated with a query 114 and/or a data object 106 is a teenager, and may be sure of this determination to a varying degree based upon the context data used to make that determination. The ability to determine, use, and/or display these confidence intervals can be desirable. For example, the confidence intervals may be used to modify presentation of search results 124 on the basis of confidence in contextual determinations. If a high degree of confidence is determined, a small number of highly relevant search results may be displayed. If a relatively low degree of confidence is determined, a large number of results may be presented. Similarly, related searches may be suggested to a searcher and/or automatically included in the search results 124 on the basis of determining with a high degree of confidence that the related searches are relevant.

Additionally, a searching entity may want to identify search results 124 that are believed to be associated with a teenager for a particular reason, and can filter the search results 124 by the desired context data. For example, if a targeted advertisement for a product is aimed at middle-aged men because of their propensity to lose their hair, a person believed to be a middle-aged man because of a query 114 for "cure for male pattern baldness" may be particularly relevant and/or desirable.

Search results 124 can be filtered, located, ranked, summarized, and the like, by using and representing context. For example, a person may be curious to see what "teenagers" near him or her are saying about the movie "AVATAR." Search results 124 obtained without using context may simply search for "AVATAR." The search results 124 may be organized from the most recent to the least recent. According to some embodiments as disclosed herein, however, the query context data 116 is used to determine the location of the searcher. Additionally, the context data 108 and/or the data stored at the historical data 122 are analyzed to find teenagers, or those thought to be teenagers at least, who have posted at or near the searcher's location on the movie "AVATAR." The indication that a poster is a teenager can be based upon explicit and/or implicit data, and can have a corresponding confidence value.

In another example, an additional contextual aspect of sentiment can be used to obtain a summary of how the sentiment of teenagers near the searcher has trended over time on the subject of the movie "AVATAR." The context server 102C can generate a summary showing how sentiment has trended over time on the subject of "AVATAR," as posted on by parties deemed to be teenagers at or near the location of the searcher. Furthermore, the searcher may enter a query 114 seeking to identify what people who share the same interests, age, location, friends, content interests, and the like, feel about the move "AVATAR." Thus, the context associated with various people among many different dimensions may be represented and analyzed to identify parties "similar" to the searcher.

In yet another example, the use of context allows objects to become active in specific contexts. For example, if a party is at an event at a specific location and time, the event context can become active and can be used to push targeted relevant information to the party. Similarly, other context information may become active, and relevant information associated with the event, location, venue, or other person or entity associated with the event can be pushed to the party or the client device 112. The relevant information may be determined based, at least partially, upon the context of the event including, but not limited to, location and time. Thus, the context can be used to implicitly generate a query 114 as explained above.

Similarly, the context can be used to enable the party to post information more efficiently and effectively by adding contextual data to a post or update. In the above example of a party at an event, when the party posts information from the event, the location, time, venue, event, and/or other context information can be built into the post to disambiguate information in their post and to allow future use of that post, as described above with reference to the data object 106 and the context data 108. It should be understood that the data objects 106 can become active in any context including, but not limited to, location, time, date, events, people, any other context data 108 described above, combinations thereof, and the like.

As mentioned above, detailed context data can allow analysis to be performed by searchers such as determining what has happened and who has been at a particular location over time, for example. Additionally, searchers can find others who have seen or been to the same places, watched the same movies, heard the same audio, gone to the same concerts, and the like, based upon contextual information. All of the above examples are illustrative, and should not be construed as being limiting in any way.

Figure 5:
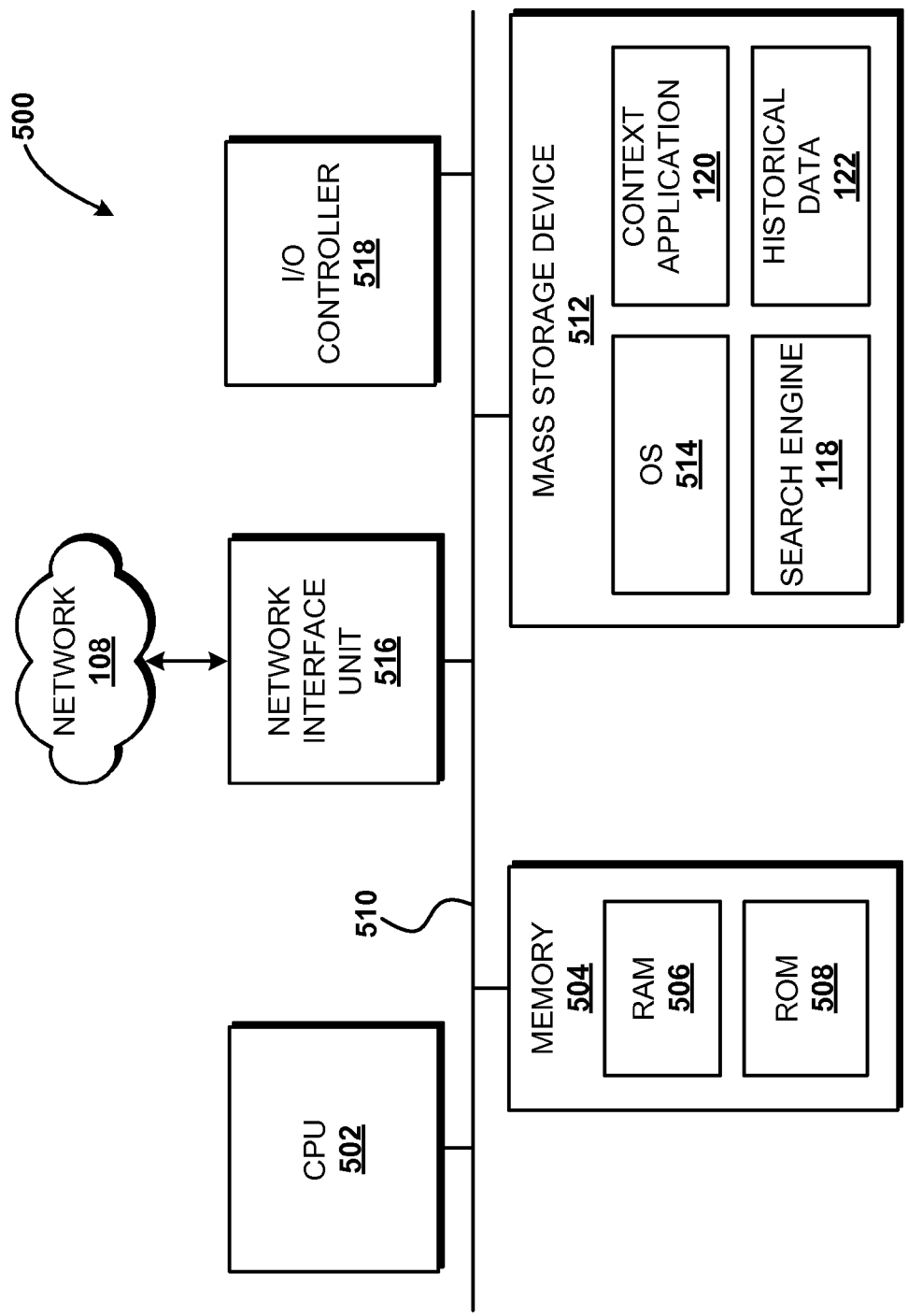
FIG. 5 is a computer architecture diagram illustrating an exemplary computer hardware and software architecture for a computing system capable of implementing aspects of the embodiments presented herein.

FIG. 5 illustrates an exemplary computer architecture 500 for a context server 102C capable of executing the software components described herein for providing context-based services as described above. The computer architecture 500 illustrated in FIG. 5 illustrates a conventional server, desktop, and/or laptop computer, and may be utilized to execute any aspects of the software components presented herein, including the search engine 118, the context application 120, and/or other program modules.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 514, and application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media that can be accessed by the computer architecture 500.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500.

According to various embodiments, the computer architecture 500 may operate in a networked environment using logical connections to remote computers through a network such as the network 104. The computer architecture 500 may connect to the network 104 through a network interface unit 516 connected to the bus 510. It should be appreciated that the network interface unit 516 also may be utilized to connect to other types of networks and remote computer systems. The computer architecture 500 also may include an input/output controller 518 for receiving and processing input from a number of other devices, including a keyboard, mouse, or electronic stylus (not shown in FIG. 5). Similarly, the input/ output controller 518 may provide output to a display screen, a printer, or other type of output device (also not shown in FIG. 5).

As mentioned briefly above, a number of program modules and data files may be stored in the mass storage device 512 and RAM 506 of the computer architecture 500. The mass storage device 512 and RAM 506 also may store other types of program modules and data, including the historical data 122 described above.

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that technologies for context-based services have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for providing context-based services, the computer-implemented method comprising performing computer-implemented operations for:
   receiving, at a computer executing a context application, a request for context-based output;
   determining a context associated with the request for the context-based output, the context comprising a time at which the request was submitted and at least one of a location at which the request was submitted or a device used to generate the request;
   updating the request based upon the context, wherein updating the request comprises manipulating the request by incorporating additional information relevant to the request as indicated by the context to create an updated request, and wherein the updated request includes at least a portion of the request;
   identifying the context-based output based upon the updated request;
   diversifying the context-based output by
      identifying terms related to the context associated with the request,
      identifying additional context-based output related to the terms, and
      adding the additional context-based output to the context-based output to create a diversified context-based output; and
   outputting the diversified context-based output.

2. The method of claim 1, wherein
   receiving the request for the context-based output comprises receiving an implicitly augmented query comprising one or more contexts associated with a client device,
   obtaining relevant data for at least one of the one or more contexts associated with the client device, and
   pushing the relevant data to the client device.

3. The method of claim 2, wherein the relevant data is used to augment a social networking post or a social networking status update generated at the client device.

4. The method of claim 1, wherein the request for the context-based output comprises a search query, and wherein the context-based output comprises search results, and further comprising:
   identifying a data object corresponding to a one of the search results;
   obtaining context data corresponding to the data object; and
   associating the context data with the data object.

5. The method of claim 4, wherein the context-based output comprises a search result set, and the method further comprises:
- identifying a data object corresponding to one of the search results;
- obtaining context data corresponding to a context associated with the data object;
- comparing the context associated with the search query with the context associated with the data object; and
- ranking the search result set corresponding to the data object based upon the comparing.

6. The method of claim 5, further comprising:
- ranking the search result higher, in response to determining that the context associated with the data object is similar to the context associated with the search query, wherein determining that the context associated with the data object is similar to the context associated with the search query comprises determining that the data object and the search query were created at the same geographic location.

7. The method of claim 1, wherein the request for the context-based output comprises a search query, and wherein determining the context associated with the request further comprises:
- obtaining query context data associated with the search query;
- analyzing the query context data to identify a context associated with the search query; and
- manipulating the search query to reflect the identified context.

8. The method of claim 1, wherein the request for the context-based output comprises a search query, wherein identifying the context comprises identifying a client device used to generate the search query and determining a capability of the client device with an associated confidence interval, and wherein manipulating the search query comprises adding a term, operator, and metadata to the search query, the term, operator, and metadata indicating the capability of the client device and the associated confidence interval.

9. The method of claim 1, wherein the request for the context-based output comprises a search query, wherein identifying the context comprises identifying a geographic location at which the search query was generated, and wherein updating the request comprises adding data indicating the geographic location to the search query.

10. The method of claim 1, wherein the request for the context-based output comprises a search query, wherein identifying the context comprises identifying a time at which the search query was generated, and wherein updating the request comprises adding data indicating the time to the search query.

11. An apparatus, comprising:
- a processor; and
- a memory storing a context application for execution on the processor and configured to
- receive a search query for a search of real-time data, the search query being received from a client device,
- determine a context associated with the search query by analyzing query context data obtained from the client device, the context comprising location data, time data, device data, and a confidence interval associated with the location data, the time data, or the device data,
- update the search query based upon the context, wherein updating the search query comprises manipulating the search query by incorporating additional information relevant to the search query as indicated by the context to obtain an updated search query, and wherein the updated search query includes at least a portion of the search query,
- identify search results based upon the updated search query,
- diversify the search results by
  - identifying terms related to the context associated with the search query,
  - identifying additional search results related to the terms, and
  - adding the additional search results to the search results to create diversified search results, and
- output the diversified search results.

12. The apparatus of claim 11, wherein the real-time data comprises at least one of a social networking wall associated with a user or real-time messages posted by a user.

13. The apparatus of claim 11, wherein determining the context associated with the query further comprises:
- obtaining the query context data from the client device;
- analyzing the query context data to identify a context associated with the search query; and
- manipulating the search query to reflect the identified context.

14. The apparatus of claim 13, wherein the context application is further configured to:
- identify a data object corresponding to a one of the search results;
- obtain context data corresponding to a context associated with the data object;
- compare the context associated with the search query with the context associated with the data object; and
- rank the search results corresponding to the data object based upon the comparing.

15. The apparatus of claim 11, wherein the context application is further configured to:
- analyze the query context data to identify a context associated with the search query;
- manipulate the search query to reflect the identified context;
- identify a data object corresponding to a one of the search results;
- obtain context data corresponding to a context associated with the data object;
- compare the context associated with the search query with the context associated with the data object; and
- filter the search results corresponding to data objects for which the context is not similar to the context associated with the search query.

16. A computer-readable storage medium having computer-readable instructions stored thereupon that, when executed by a computer, cause the computer to:
- receive a query for real-time messages posted to a real-time messaging service, the query being received from a client device;
- determine a query context associated with the query by analyzing query context data obtained from the client device to identify a context within which the query was generated, the query context data comprising location data indicating a geographic location at which the query was generated, time data indicating a time at which the query was generated, device data indicating a type of device used to generate the query, and a confidence interval associated with at least one of the location data, the time data, or the device data;
- manipulate the query to reflect the identified context, wherein manipulating the query comprises incorporating additional information relevant to the query as indicated by the identified context to create a manipulated query, and wherein the manipulated query includes at least a portion of the query;

identify search results based upon the manipulated query;

diversify the search results by identifying terms related to the context associated with the query, identifying additional search results related to the terms, and adding the additional search results to the search results to create diversified search results;

identify a data object corresponding to a one of the diversified search results;

obtain data object context data corresponding to a context within which the data object was generated;

associate the data object context data with the data object;

store data indicating that the data object context data and the data object are associated at a data storage location;

compare the query context with the data object context; and rank the diversified search results corresponding to the data object based upon the comparing.

17. The apparatus of claim 11, wherein the time data indicates a time at which the search query was created, wherein the location data indicates a geographic location at which the search query was created, and wherein the device data indicates a capability of the client device.

18. The apparatus of claim 17, wherein the context further comprises pattern data indicating a pattern associated with the location data, the time data, and the device data, and wherein the context application is further configured to analyze the pattern data to determine if the query context data is typical for a user associated with the client device or whether the query context data is atypical for the user.

19. The apparatus of claim 11, wherein the context application is further configured to:

generate a filter based upon an aspect of the context not used to generate the updated search query; and filter the identified search results using the filter without further modifying the updated search query or the search query.

20. The apparatus of claim 11, wherein the context application is further configured to:

access a log storing queries and click logs associated with search sessions;

determine, based upon the device data, a type of device used to submit the search query;

identify relevant search session activity in the logs by identifying activity in the search sessions conducted on the type of device; and rank the identified search results based upon the relevant search session activity in the logs.

* * * * *